(12) United States Patent  (10) Patent No.: US 7,175,326 B2
Bossomo  (45) Date of Patent: Feb. 13, 2007

(54) FIBER OPTIC PANEL ILLUMINATED MAILBOX

(76) Inventor: Robert J. Bossomo, 508 Hartford Valley Dr., Wentzville, MO (US) 63385

( * ) Notice: Subject to any disclaimer, the term of this patent is extended or adjusted under 35 U.S.C. 154(b) by 175 days.

(21) Appl. No.: 10/986,663

(22) Filed: Nov. 12, 2004

(65) Prior Publication Data

US 2006/0104055 A1   May 18, 2006

(51) Int. Cl.
F21L 13/00 (2006.01)
F21S 9/03 (2006.01)

(52) U.S. Cl. .................. 362/554; 362/276; 362/154; 40/566

(58) Field of Classification Search .......... 362/554, 362/555, 581, 157, 276, 802, 183, 431, 154, 362/556; 232/17, 45; 40/547, 566; 385/120
See application file for complete search history.

(56) References Cited

U.S. PATENT DOCUMENTS

| | | | |
|---|---|---|---|
| 1,842,597 A | 1/1932 | Foti | |
| 3,521,047 A | 7/1970 | Smith | |
| 4,416,414 A | 11/1983 | Edgerton | |
| 5,143,285 A | 9/1992 | Wise | |
| D356,423 S | 3/1995 | Kresin | |
| 5,408,773 A * | 4/1995 | Hwang | 40/547 |
| D382,910 S | 8/1997 | Greenfield | |
| D412,015 S | 7/1999 | Greenfield | |
| D413,704 S | 9/1999 | Metchear | |
| 6,017,131 A | 1/2000 | Goins | |
| 6,050,012 A | 4/2000 | Greenfield | |
| 6,601,968 B2 | 8/2003 | Voacola | |
| 6,964,366 B2 * | 11/2005 | Peng et al. | 232/38 |
| 2003/0053308 A1 * | 3/2003 | Cathel | 362/154 |
| 2004/0076013 A1 * | 4/2004 | Tseng | 362/431 |
| 2004/0250457 A1 * | 12/2004 | Strein et al. | 40/547 |

* cited by examiner

Primary Examiner—Stephen Husar
Assistant Examiner—Peggy A. Neils
(74) Attorney, Agent, or Firm—Kevin L. Klug

(57) ABSTRACT

A fiber optic panel illuminated mailbox having a solar energy collection system and a control circuit which illuminates a light emitting diode which feeds a fiber optic panel. The fiber optic panel is placed behind cutouts which represent address numbers in order to provide mailbox address location during nighttime hours. The control circuitry turns on the light emitting diode during nighttime hours and charges batteries during daytime hours. The fiber optic panel illuminated mailbox is a self contained illuminated mailbox address number identification system which does not require external wiring.

12 Claims, 7 Drawing Sheets

FIBER OPTIC PANEL ILLUMINATED MAILBOX

BACKGROUND OF THE INVENTION

The present invention relates in general to illuminated mailboxes, and more particularly, to an illuminated mailbox which utilizes solar power and one or more fiber optic illumination panels fed with one or more low power consumption and high lumen output light emitting diodes (LEDs). The present invention represents a unique illuminated mailbox apparatus which collects and stores solar power during daylight hours, automatically turns on an LED during nighttime hours, and feeds the LED light through a fiber optic bundle to a fiber optic illumination panel located behind the street number openings or cutouts on the post of the mailbox.

Mailboxes are often placed near the road or street on which a residence or business is located and serve to display the address number at the location in addition to the traditional mail collection function. Traditionally, the address number is marked or painted upon the mailbox or mailbox post. Without illumination, the address number is difficult to see and locate at night. Prior art attempts at mailbox address number illumination have utilized incandescent or flourescent lighting which require electric utility power connection from the residence or business. The prior art necessity of running electrical power wiring from the main utility power supply created a labor intensive mailbox installation process. That is, installing a mailbox is a relatively quick and easy task but running, burying, and connecting electric wire cables is quite time consuming and often requires specialized and skilled labor.

The prior art is replete with attempts to illuminate address numbers. U.S. Pat. No. 5,143,285 by Wise entitled Illuminated Mailbox Support with Photo-Cell utilizes fluorescent tubes requiring electrical wire hookup to utility power. U.S. Pat. No. 6,601,968 by Voacolo entitled Freestanding Mailbox with Damage Resistant Illumination utilizes a below ground illumination source which also requires electrical wire hookup to utility power. U.S. Pat. No. 6,050,012 by Greenfield entitled Panel-Joining Bracket describes an internally lit address sign with conventional incandescent or flourescent illumination, again requiring electrical wire hookup to utility power. U.S. Pat. No. 3,521,047 by Smith entitled Flourescent Yard Light with Illuminated Indicia describes a yard light with an internal flourescent light for post illumination but also requires electrical wire hookup with utility power. U.S. Pat. No. 1,842,597 by Foti entitled Mail Box describes an illuminated mailbox which further requires electrical wire hookup to utility power. U.S. Pat. No. 6,017,131 by Goins entitled Illuminated Mail Box Post also describes an internally lit mail box post but as expected requires electrical wire hookup to utility power.

As can be seen from the prior art, the traditional tradeoff of nightime illumination energy required and daytime solar energy collected has precluded the prior art from utilizing solar energy and forced said inventors to utilize main utility power with the inherent complexities of installation. The present art apparatus utilizes the unique synergy of a high lumen output LED with low power utilization and a fiber optic illumination panel which allows for mailbox address number illumination without the need for utility power.

The unique combination of the present art allows utilization of a single LED to illuminate the address number which is preferably cut from the post onto which the mailbox is mounted. Utilization of a single LED alone without said illumination panel would not fully illuminate the address number cutouts in said post since the light cannot be uniformly distributed across the address number area. Nevertheless, when a single LED is used with the fiber optic illumination panel, the address number(s) may be fully illuminated with a minimal power requirement with a duration lasting throughout the night cycle. That is, since the single LED utilizes such a small amount of power, the daylight energy collected by a small solar cell and stored during daylight hours is capable of illuminating the address numbers throughout the nighttime hours.

Further unique to the present invention is the tapered triangular cross-section mailbox with triangular door and triangular cross-section post for mailbox support.

Accordingly, it is an object of the present invention to provide a fiber optic panel illuminated mailbox which is capable of collecting and storing sufficient solar energy during daytime hours and utilize said energy to display address or other characters during the duration the following nighttime hours.

Another object of the present invention is to provide a fiber optic panel illuminated mailbox which utilizes a small and minimally seen solar energy collector and yet is able to display address or other characters during the following nighttime hours without wire connection to a utility power supply.

A further object of the present invention is to provide a fiber optic panel illuminated mailbox having a tapered triangular cross-section mailbox with triangular door and triangular cross-section mounting post.

SUMMARY OF THE INVENTION

To accomplish the foregoing and other objects of this invention there is provided a fiber optic panel illuminated mailbox having a solar cell energy collector of minimal size, control circuitry, battery storage, a light emitting diode (LED) illumination source feeding a fiber optic panel, a mail box, a mounting post having address number or other shaped cutouts behind which is mounted said fiber optic panel. The art of the present invention is especially suited for address illumination applications where utility power is not available or is inconvenient to wire and hookup.

The unique combination of the aforesaid has yet to be assembled and utilized in a mailbox address number illumination application. Utilization of high output illumination LEDs along with a fiber optic light emitting panel allows for the unique function of the present art. Fiber optic panels have traditionally been utilized for back lighting liquid crystal displays. U.S. Pat. No. 4,885,663 issued to Parker on Dec. 5, 1989 describes the technology of fiber optic panel construction. Said panels are typically woven from plastic optical fibers in a unique bending form which provides a panel which has a uniform illumination across its surface. The unique uniform light distribution across said panel, allows said panel to be fed from a low power consumption point source such as an LED and yet uniformly illuminate a cutout of address numbers within a mailbox post. As aforesaid, the combination of a high output LED which utilizes low power and the aforesaid fiber optic panel allows the modest energy available from the solar charged battery system to fully illuminate the address numbers during the nighttime hours.

Complementing the aforesaid is a unique triangular cross section mailbox support which allows a single fiber optic panel to illuminate two sets of address number cutouts for both directions of street travel. That is, by forming the support post with a triangular cross section, a single fiber optic panel may be placed on a first wall of the triangular cross section with the number cutouts placed opposite on the other walls of the triangular cross section. This arrangement allows light emitting from the panel to be seen through both number cutouts in the post. Alternative embodiments may utilize posts of different cross sections including but not limited to circular, elliptic, hexagonal, or octagonal to provide the same bi-directional lighting without departing from the conceptual scope and spirit of the aforesaid single panel illumination feature.

The control circuitry accepts the charge available from the solar cell, charges one or more rechargeable batteries, and also turns on the LED when it senses that solar energy is no longer available. That is, during nighttime hours the LED is lit via the stored energy within the rechargeable batteries.

In operation, the user installs the fiber optic panel illuminated mailbox, typically within a concrete base or a post hole, turns on the illumination circuit switch and that is all. The mailbox automatically illuminates itself during nighttime hours and recharges during daylight hours.

This fiber optic panel illuminated mailbox may be manufactured from many types of materials including but not limited to plastics, composites, woods, and various metals and their alloys as required by the application. In a preferred embodiment, the post and mailbox are manufactured from a steel alloy.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
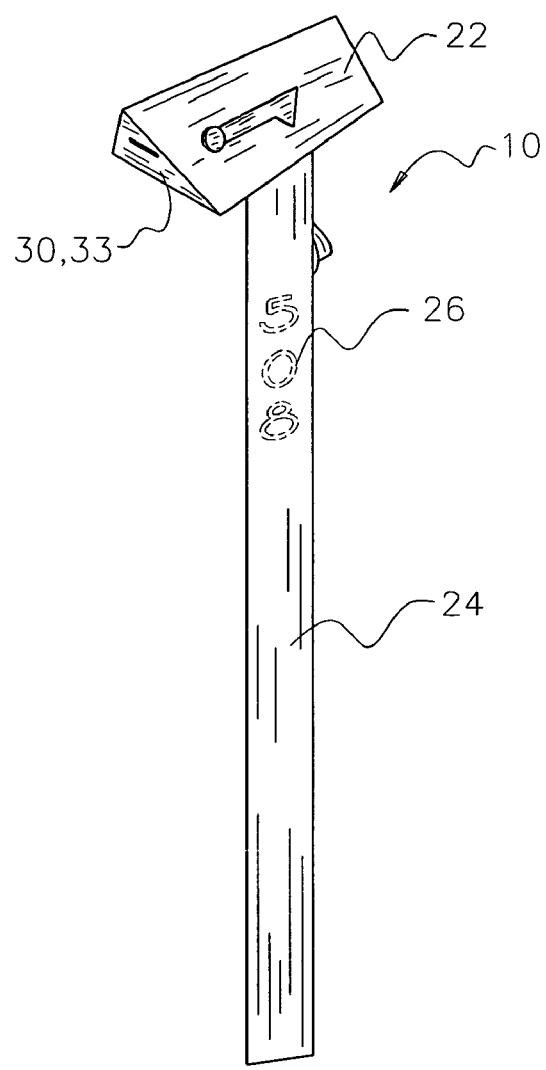
FIG. 1 is a front perspective view of a fiber optic panel illuminated mailbox.
Figure 2:
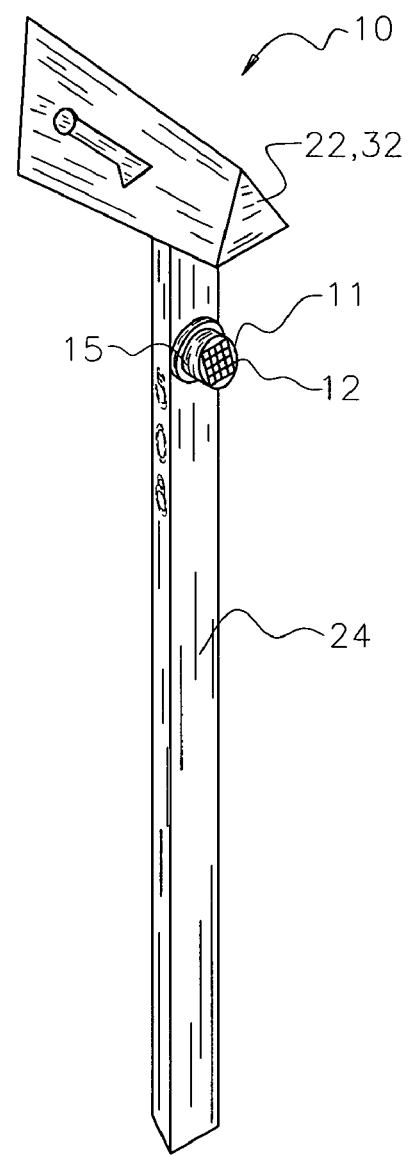
FIG. 2 is a rear perspective view thereof.
Figure 3:
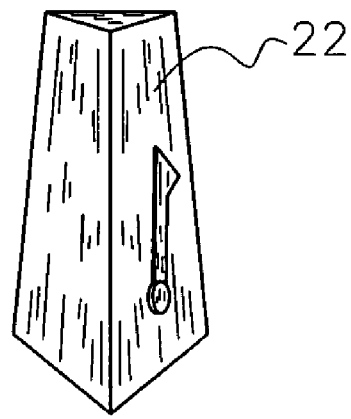
FIG. 3 is a top plan view thereof.
Figure 4:
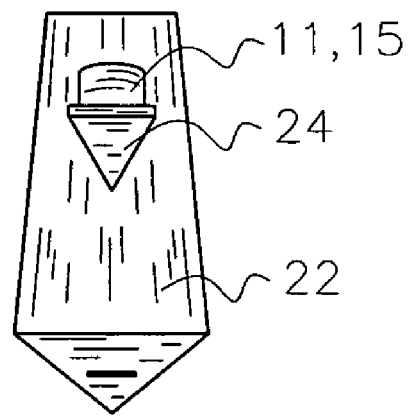
FIG. 4 is a bottom plan view thereof.
Figures 5, 6:
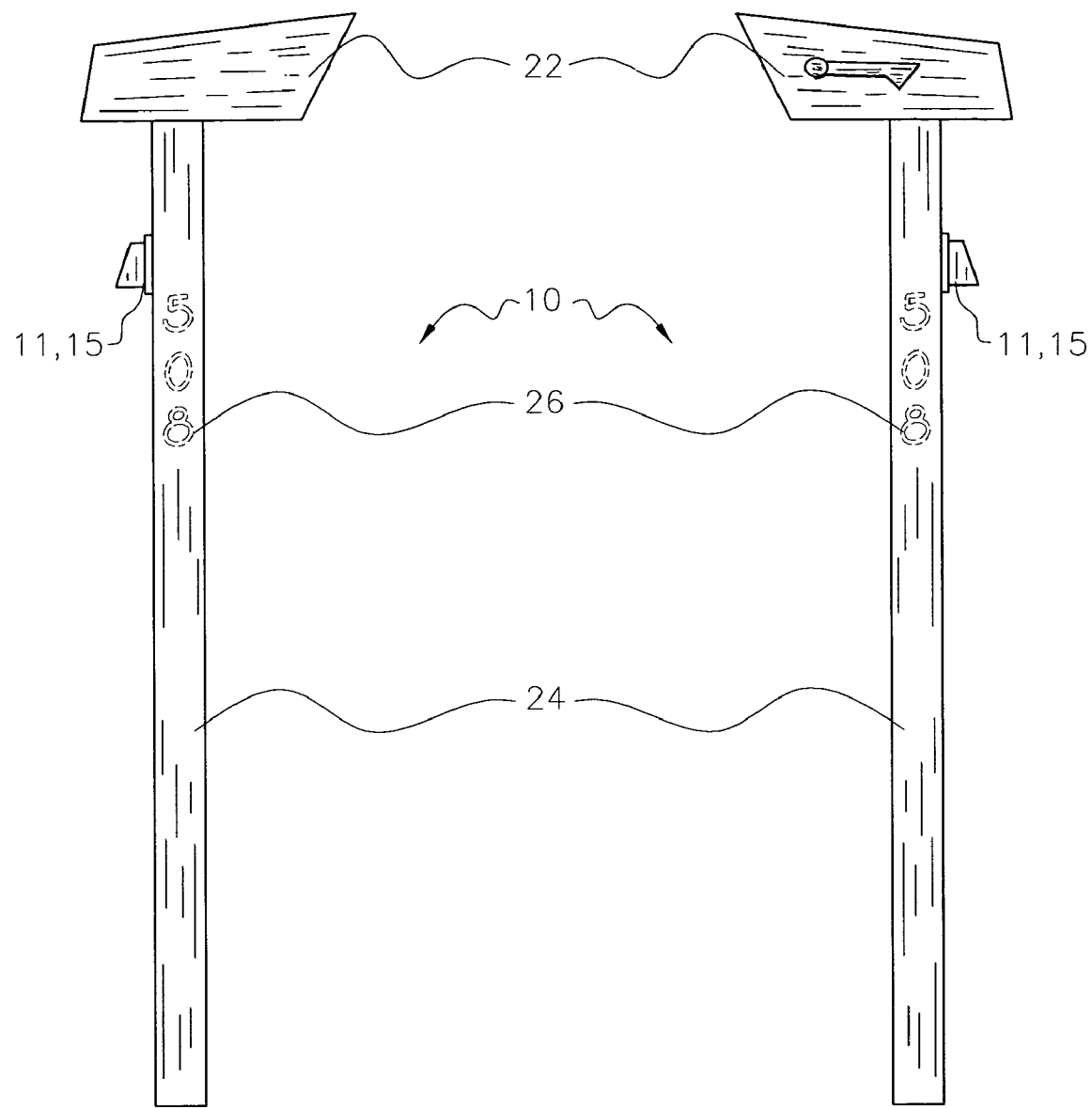
FIG. 5 is a left side plan view thereof.
FIG. 6 is a right side plan view thereof.
Figures 7, 8:
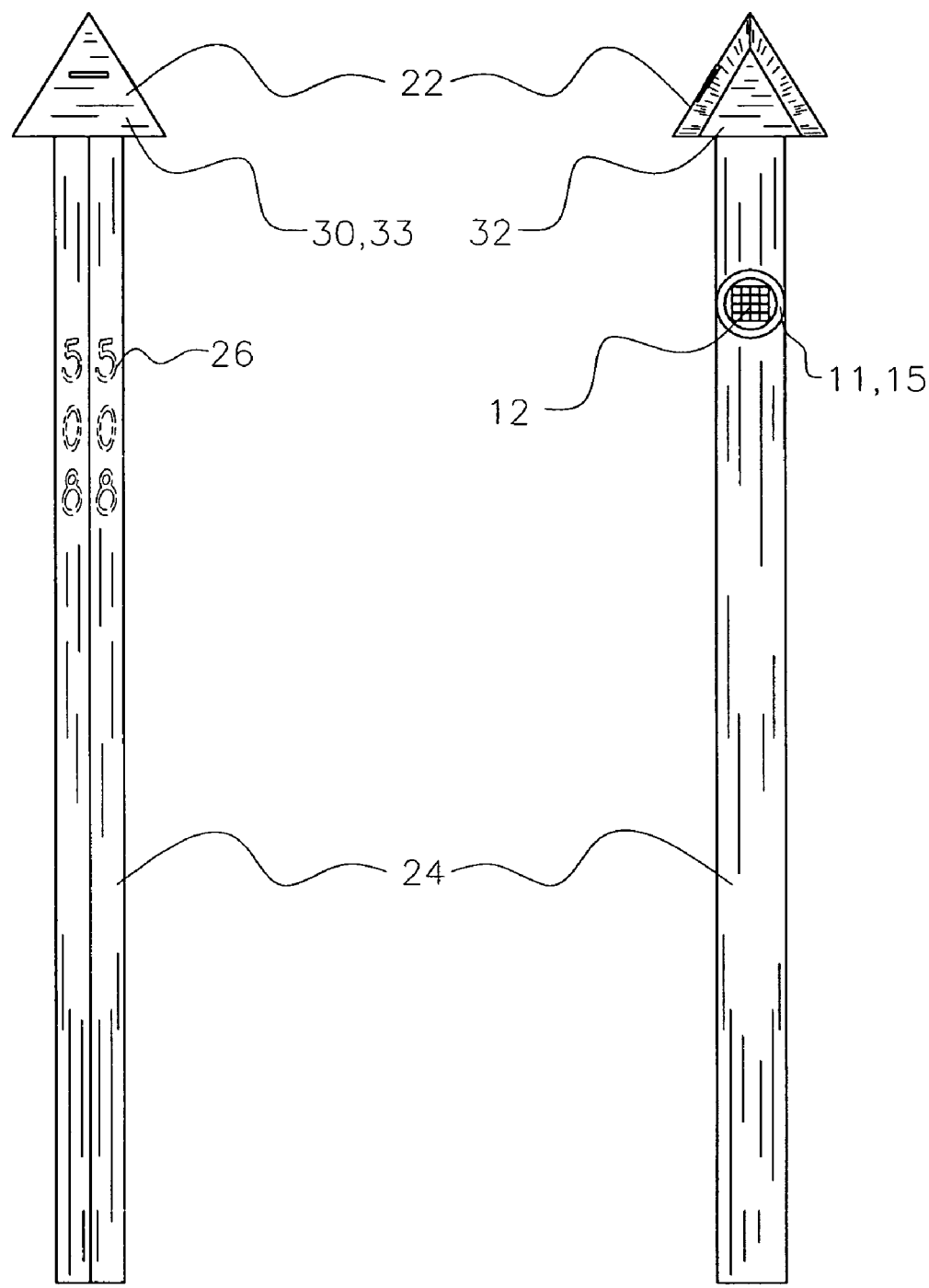
FIG. 7 is a front side plan view thereof.
FIG. 8 is a rear side plan view thereof.
Figure 9:
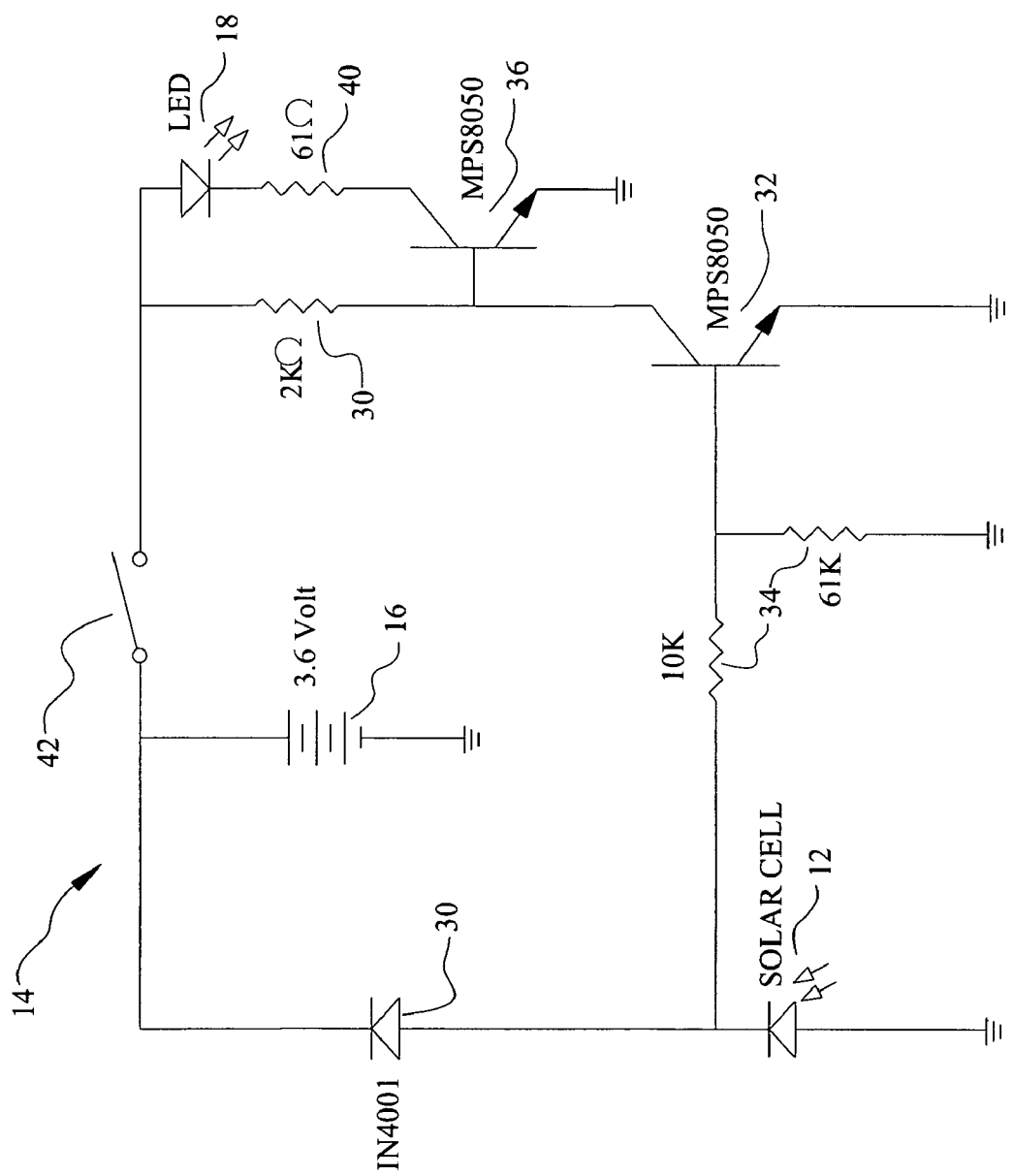
FIG. 9 is a schematic diagram of the control circuit thereof.
Figure 10:
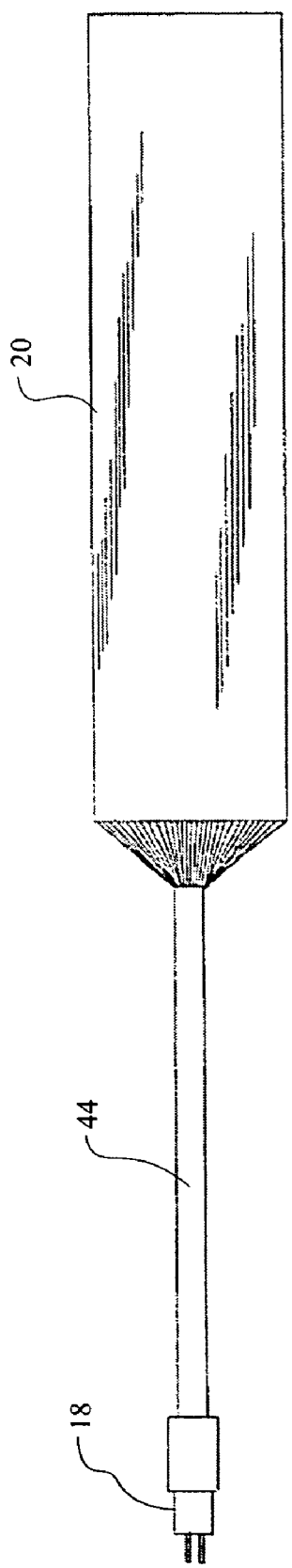
FIG. 10 is a top side plan view of the fiber optic illumination panel thereof showing the LED, LED socket, fiber optic bundle, and illumination panel.
Figure 11:
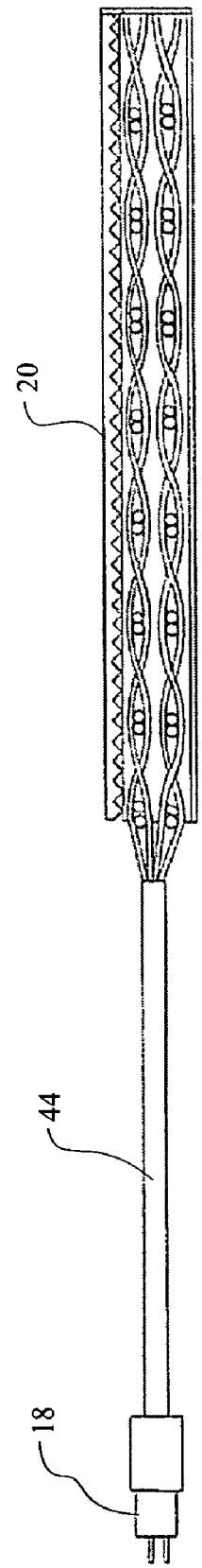
FIG. 11 is a right side plan view of the fiber optic illumination panel thereof showing the LED, LED socket, fiber optic bundle, and illumination panel.
Figure 12:
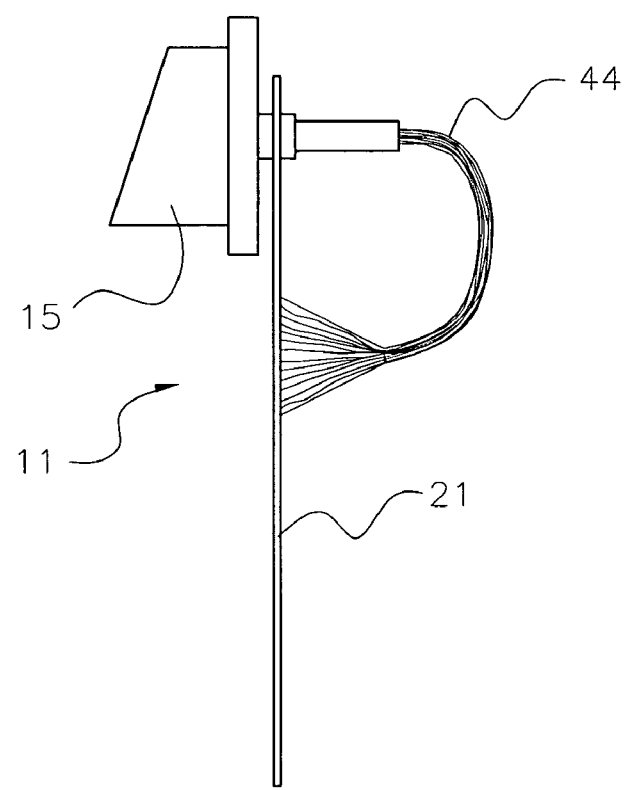
FIG. 12 is a perspective view of the cell circuit assembly thereof.
Figure 13:
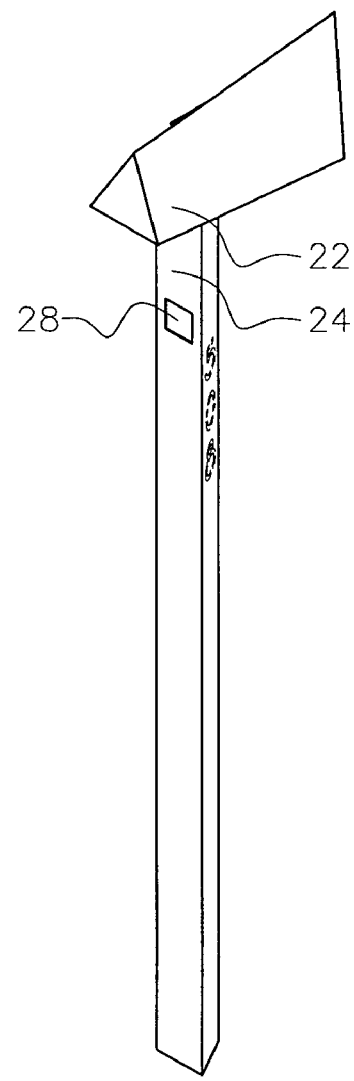
FIG. 13 is a rear side plan view thereof with the cell circuit assembly removed and further showing the mounting opening.

Referring now to the drawings, there is shown a preferred embodiment of the fiber optic panel illuminated mailbox. As aforesaid, the fiber optic panel illuminated mailbox 10 comprises a solar cell 12 energy collector of minimal size, control circuitry 14, battery 16 storage, a light emitting diode (LED) 18 illumination source feeding a fiber optic panel 20, a mail box 22, and a mounting post 24 having address number or other shaped cutouts 26 behind which is mounted said fiber optic panel 20.

In a preferred embodiment, the mailbox 22 comprises a substantially triangular external cross section which tapers from a front portion 30 to a rear portion 32. The mailbox 22 preferably has a hinged and substantially triangular door 33 at said front portion 30. The mounting post 24, also in a preferred embodiment, comprises a substantially uniform hollow triangular tubular cross section with one or more identifying cutouts 26 which represent address numbers of the location. Alternative embodiments may have identifying cutouts 26 of a variety of shapes which are not simply numbers or may place said cutouts 26 within the mailbox 22. Further alternative embodiments may also utilize a mailbox 22 of uniform triangular cross section or of other types of cross sections in conjunction with the equivalent illumination system as described herein. Also, the aforesaid preferred and alternative embodiments may utilize mounting posts 24 of any cross section.

In a preferred embodiment, within said post 24 and through a mounting opening 28 is placed said fiber optic panel 20. Preferably said panel 20 is placed substantially near or behind said one or more cutouts 26 whereby illumination from said panel is visible through said cutouts 26. Utilization of said fiber optic panel 20 allows a single LED 18 to illuminate the one or more cutouts 26 while also minimizing power consumption.

In a preferred embodiment, said fiber optic panel 20 is mounted upon a panel base 21 with said panel base 21 further mounted with a housing 15 which holds said solar cell 12, control circuitry 14, battery 16, and LED 18, hereafter in combination known as the cell-circuit assembly 11. Alternative embodiments of said cell-circuit assembly 11 may not utilize said panel base 21. The panel base 21 with said fiber optic panel 20 fits through said mounting opening 28 and said housing 15 mounts upon said mounting post 24, preferably with one or more screws, over said mounting opening 28. When mounted in the aforesaid preferred form, said fiber optic panel 20 is placed substantially near or behind said one or more cutouts 26. With this preferred embodiment, the housing 15 remains external to said mounting post 24 and said solar cell 12 is positioned to accept solar energy. Alternative embodiments may utilize a plurality of methods to mount said fiber optic panel 20 behind said cutouts 26 and further place said solar cell 12, control circuitry 14, battery 16, and LED 18 at a plurality of locations yet retain the scope and spirit of the present invention. That is, the aforesaid may not be formed into an integrated cell-circuit assembly 11 without departing from the scope and spirit of the present invention provided said fiber optic panel 20 is utilized to illuminate said cutouts 26.

The control circuitry 14 as found within the present art is similar to that found within many solar lighting products. That is, the solar cell 12 positive output or cathode is connected through a diode 30 such as a 1N4001 or equivalent to the battery 16, preferably 3.6 volts formed by three nickel cadmium AA cells in series. Thus, whenever the solar cell 12 potential is greater than the battery 16 potential and the inherent diode 30 voltage drop of approximately 0.7 volts, the battery 16 will recharge. Alternative embodiments may utilize a plurality of solar cell 12 to battery 16 connection methods along with various battery 16 potentials.

The solar cell 12 also provides the day versus night signal which the control circuitry 14 utilizes to turn on the LED 18 during nighttime hours. That is, the solar cell 12 cathode is connected through a voltage divider 34 to the base of a first npn transistor 32, such as an MPS8050, 2N2222, or equivalent, which serves to shunt, from its collector to its grounded emitter, battery 16 bias current flowing into a second npn transistor 36, again such as an MPS8050, 2N2222, or equivalent. The base of said second npn transistor 36 is connected to the battery 16 supply through a bias resistor 38, 2 kilo-ohm in a preferred embodiment, whereby if said first transistor 32 is not biased on, current flows through the base of said second transistor 36. The collector of said second transistor 36 connects with the cathode of said LED 18 through a current limiting resistor 40 and the emitter thereof is connected with the common ground. The anode of said LED 18 connects with the battery 16 or rechargeable power supply. Thus, whenever said second transistor 36 is biased on, current flows from said battery 16, through said LED 18, through said current limiting resistor 40, through said second transistor 36 collector-emitter path to common ground. A power switch 42 is provided between said battery 16 and said bias resistor 38/LED 18 in order to interrupt current supplied from said battery 16 to said LED 18.

In operation, the first transistor 32 turns on in order to turn off the second transistor 36 and thereby turns off the LED 18. If the solar cell 12 is sufficiently illuminated, it will produce an anode to cathode potential which charges the battery 16 and biases the aforesaid first transistor 32 on, thereby turning off the LED 18. That is the control circuitry 14 recognizes daytime and does not utilize power to illuminate or turn on the LED 18. During nighttime hours, the solar cell 12 has little or no potential from anode to cathode and cannot bias the first transistor 32 on. This allows the second transistor 36 to remain on and further allows said LED 18 to illuminate. Thus, the control circuitry 14 recognizes nighttime. As presented, it is understood by those skilled in the art that resistor values and diode or transistor types may be changed without departing from the scope and spirit of the present art.

The LED 18 is connected with a fiber optic bundle 44 which feeds said fiber optic panel 20. Said fiber optic panel 20 is a commercially available illumination panel having micro bends of the fiber optic bundle 44 which emit light from the sides of the fibers. That is, the optical fibers from said fiber optic bundle 44 are positioned substantially flat with said micro bends whereby a panel of light emission is obtained. As aforesaid, said fiber optic panel is descriptively found in U.S. Pat. No. 4,885,663 and is also commercially available from Lumitex, Inc. in Strongsville, Ohio.

Alternative embodiments of the present art may utilize other forms of address number identifications other than cutouts 26. That is, the aforesaid fiber optic panel 20 may have a mask forming said address numbers or equivalent which is placed over a surface of said panel 20 which either allows or blocks the emitted light. Further alternative embodiments may form said panel 20 in the form of said address numbers or equivalent. Still further alternative embodiments may place said panel 20 exterior to said post 24. Yet still further alternative embodiments may form said mask with an active liquid crystal panel which may allow said address numbers or equivalents to be modified electronically.

As described, the art of the present invention is shown and described as a unique apparatus which allows mailbox address numbers or equivalents to be illuminated without the need for a main electrical supply connection or user involvement. The present art utilizes only stored solar energy to energize a high output LED 18 and direct the LED 18 output to an illuminated fiber optic panel 20 which heretofore has not been utilized in the present art application.

From the foregoing description, those skilled in the art will appreciate that all objects of the present invention are realized. A unique combination of electrical and mechanical elements are combined to form a mailbox having illuminated address numbers or equivalents which provide automatic and easily identifiable address location at night without user interaction.

Having described the invention in detail, those skilled in the art will appreciate that modifications may be made to the invention without departing from its spirit. Therefore, it is not intended that the scope of the invention be limited to the specific embodiments illustrated and described. Rather it is intended that the scope of this invention be determined by the appended claims and their equivalents.

What is claimed is:

1. A fiber optic panel illuminated mailbox comprising:
   a mailbox having a mounting post mounted with said mailbox, said mounting post having one or more cutouts through which light may transmit; and
   a solar cell electrically connected through a control circuitry to a battery; and
   a light emitting diode electrically connected with said control circuitry and powered by said battery; and
   a fiber optic illumination panel mounted substantially behind said one or more cutouts, said fiber optic illumination panel fed by a fiber optic bundle which is physically connected with said light emitting diode; and
   said fiber optic bundle further having a plurality of optical fibers having sides and said fiber optic illumination panel formed from said optical fibers from said fiber optic bundle at said fiber optic illumination panel and positioned substantially flat with micro bends within said optical fibers whereby a panel of light emission is obtained from said sides of said fibers and achieve a uniform light distribution; and
   said control circuitry capable of sensing nighttime whereby said light emitting diode is turned on thereby illuminating said fiber optic panel and making said one or more cutouts visible during nighttime.

2. The fiber optic panel illuminated mailbox as set forth in claim 1 whereby:
   said mounting post has a substantially triangular cross section and said single fiber optic panel is mounted on a first wall of the triangular cross section with said one or more cutouts placed opposite on one or more other walls of the triangular cross section.

3. The fiber optic panel illuminated mailbox as set forth in claim 1 whereby:
   said cutouts have the form of one or more numbers which represent the address of said mailbox.

4. The fiber optic panel illuminated mailbox as set forth in claim 2 whereby:
   said cutouts have the form of one or more numbers which represent the address of said mailbox.

5. The fiber optic panel illuminated mailbox as set forth in claim 1 whereby:
   said control circuitry comprises a diode through which said solar cell is electrically connected with said battery; and
   a cathode of said solar cell connected through a voltage divider to a base of a first transistor; and
   a second transistor having a base electrically connected with said battery through a bias resistor and electrically connected with said first transistor whereby if said first transistor is not biased on, current flows through the base of said second transistor; and a collector of said second transistor electrically connected with a cathode of said light emitting diode through a current limiting resistor and an emitter of said second transistor connected with a common ground; and an anode of said light emitting diode electrically connected with said battery, whereby whenever said second transistor is biased on, current flows from said battery, through said light emitting diode through said current limiting resistor, through said second transistor collector-emitter path to common ground.

6. The fiber optic panel illuminated mailbox as set forth in claim 1 whereby:

said solar cell is mounted with a housing whereby sunlight may illuminate said solar cell; and said control circuitry, battery, and light emitting diode mounted within said housing whereby said fiber optic panel is placed through a mounting opening within said mounting post and said housing is mounted on said mounting post over said mounting opening.

7. The fiber optic panel illuminated mailbox as set forth in claim 6 further comprising:

a panel base mounted with said housing upon which said fiber optic panel is mounted.

8. A fiber optic panel illuminated mailbox comprising:

a mailbox having a mounting post; and one or more identifying cutouts within said mailbox or said post; and one or more fiber optic illumination panels mounted behind said cutouts; and said fiber optic illumination panels formed and fed from a fiber optic bundle further having a plurality of optical fibers and said fiber optic illumination panels formed from said optical fibers from said fiber optic bundle at said fiber optic illumination panel and positioned substantially flat with micro bends within said optical fibers whereby a panel of light emission is obtained from said fibers and achieve a uniform light distribution; and a solar cell, a battery, one or more light emitting diodes connected with said fiber optic panels, and a control circuitry, said control circuitry capable of charging said battery from power supplied by said solar cell and further capable of illuminating said light emitting diode during nighttime hours.

9. A fiber optic panel illuminated mailbox comprising:

a mailbox having a mounting post; and a control circuit, a solar cell, and a battery charged by said solar cell through said control circuitry; and an illumination source powered by said battery and controlled by said control circuit, said illumination source feeding a fiber optic panel via a fiber optic bundle having a plurality of optical fibers; and at least a portion of said fiber optic bundle positioned substantially flat with microbends within at least some of said optical fibers whereby a panel of light emission is obtained from said fibers and achieve a uniform light distribution; and said fiber optic panel formed and positioned to represent address numbers of said mailbox whereby said control circuit illuminates said fiber optic panel during nighttime.

10. The fiber optic panel illuminated mailbox as set forth in claim 9 whereby:

said mailbox is substantially triangular in cross section and said mounting post is substantially triangular and hollow in cross section.

11. The fiber optic panel illuminated mailbox as set forth in claim 10 whereby:

said fiber optic panel is positioned behind one or more cutouts within said mounting post whereby said address numbers are represented by an illumination from said fiber optic panel shining through said one or more cutouts.

12. The fiber optic panel illuminated mailbox as set forth in claim 11 whereby:

said control circuit comprises a diode through which said solar cell is electrically connected with said battery; and a cathode of said solar cell connected through a voltage divider to a base of a first transistor; and a second transistor having a base electrically connected with said battery through a bias resistor and electrically connected with said first transistor whereby if said first transistor is not biased on, current flows through the base of said second transistor; and a collector of said second transistor electrically connected with a cathode of said light emitting diode through a current limiting resistor and an emitter of said second transistor connected with a common ground; and an anode of said light emitting diode electrically connected with said battery, whereby whenever said second transistor is biased on, current flows from said battery, through said light emitting diode through said current limiting resistor, through said second transistor collector-emitter path to common ground.

\* \* \* \* \*